UNITED STATES PATENT OFFICE.

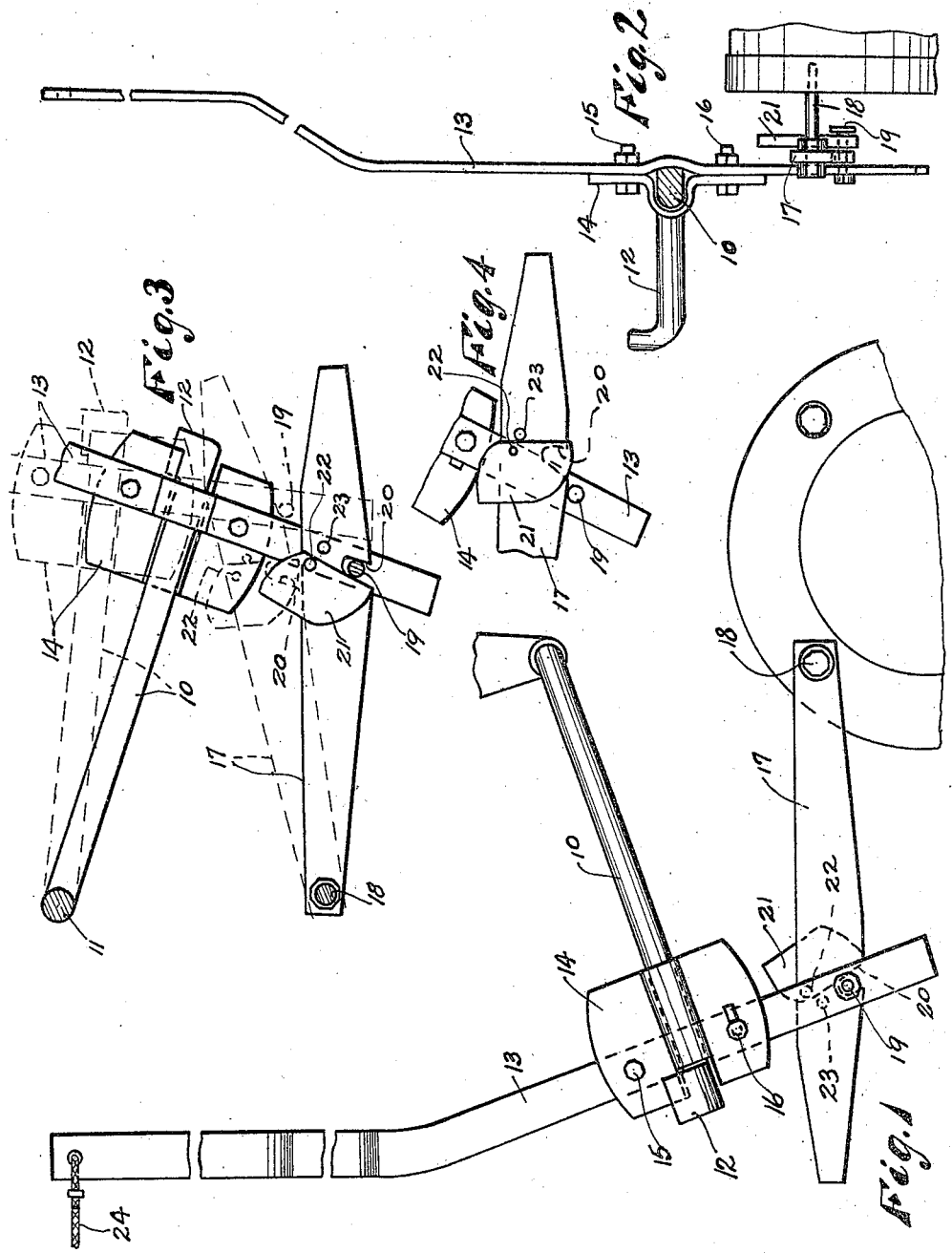

WILLIAM B. HUGGINS, OF KNOX COUNTY, ILLINOIS.

CLUTCH LOCK FOR MOTOR VEHICLES.

1,412,246.  Specification of Letters Patent.  Patented Apr. 11, 1922.

Application filed September 23, 1920. Serial No. 412,319.

*To all whom it may concern:*

Be it known that I, WILLIAM B. HUGGINS, a citizen of the United States, and a resident of the county of Knox and State of Illinois, have invented certain new and useful Improvements in Clutch Locks for Motor Vehicles, of which the following is a specification.

My invention relates to clutch locks for motor vehicles and is particularly designed for use in connection with tractors in which the clutch operatively connecting the motor with the driving mechanism of the vehicle is thrown out of operation against the action of a spring by the movement of a foot pedal or other suitable controlling lever, as is common practice.

It is the principal object of my invention to provide a new and improved form and arrangements of parts by the use of which the controlling lever can be operated by means of a link or cable extending to any desired point and by which the clutch is locked in inoperative position until subsequently released by the operator.

Other objects will appear hereinafter.

The invention consists in the combinations and arrangements of parts hereinafter described and claimed.

The invention will be best understood by reference to the accompanying drawings forming a part of this specification, and in which, Fig. 1 is a side view showing my improved structure applied to a tractor, Fig. 2 is a view of the parts shown in Fig. 1 as seen from the front, Fig. 3 is a view of the parts shown in Fig. 2, partly broken away, as seen from the right in Fig. 2, and showing a changed position of the parts in dotted lines, and Fig. 4 is a fragmentary view showing still another changed position of the parts.

Referring to the drawings, 10 indicates the clutch controlling device, which in the construction shown is in the form of a foot lever pivotally mounted at 11, see Fig. 3. As will be readily understood, upon a downward stroke of the lever 10 by pressure upon the pedal 12 the operative members of the clutch are thrown out of operative engagement. Inasmuch as the clutch is of any approved type and forms of itself no part of my present invention, it is not believed to be necessary to illustrate or describe the same herein. It will be understood that upon the release of the lever 10 the same is returned to normal position by means of the spring of the clutch, as is usual in constructions of this type.

An arm 13 is mounted upon the end of the foot lever 12 by means of a plate 14 which extends about the lever as is best shown in Fig. 2. The plate 14 is secured to the arm 13 by means of bolts 15 and 16 passing through suitable openings through the arm and through the plate 14, the opening in the plate 14 for the bolt 16 being in the form of a slot as is best shown in Fig. 1. By the provision of the slot for the bolt 16, the arm 13 is adapted to have a pivotal motion with respect to the lever 10.

Means is provided for holding the foot lever 10 in its lowered position when such lever is given an operative stroke for throwing the clutch members out of engagement. This means in the construction shown is adapted to operate automatically upon the operative stroke of the lever 10. In the construction shown, means is also provided for automatically disengaging this holding means preparatory to the upward stroke of the lever 10 effected by the clutch spring as above described. The means provided for holding the lever 10 in lowered position comprises a latch 17 which is pivotally mounted by a bolt 18 upon any suitable portion of the frame work of the tractor. As is best shown in Fig. 3, this latch member 17 normally rests upon a pin 19 carried by the arm 13 a short distance below the foot lever 10. When the foot lever is given an operative downward stroke for throwing the clutch members out of operation, the pin 19 slides along the lower face of the latch 17 until the pin comes into engagement with a notch 20 formed in the under face of the member 17. The notch 20 is so disposed in the latch member 17 as to form a hook which is adapted to hold the latch member 17 and the arm 13 in engagement until the latch member 17 has been raised with respect to the arm for disengaging the pin from the notch.

The means provided for automatically effecting a disengagement of the latch member from the arm 13 comprises a plate 21 in the form of a cam pivotally mounted by means of a pin 22 upon the latch member in position to stand normally directly opposite the notch 20, as is shown in Fig. 4. A pin 23 is mounted upon the latch member 17 in position to act as a stop for engagement by the cam plate 21 for holding the plate against rotation in counter clockwise direction in Fig. 4 beyond the position at which the plate stands normally opposite the notch 20. With the notch 20 in engagement with the pin 19, as is shown in solid lines in Figs. 1 and 3, a movement of the arm 13 in clockwise direction, in Fig. 3, serves to carry the parts into the position shown in Fig. 4, in which the pin 19 has passed beyond the lowermost portion of the plate 21 so as to permit the plate 21 to drop again into normal position opposite the notch 20. Upon a subsequent movement of the arm 13 in counter-clockwise direction, in Figs. 3 and 4, the pin 19 is caused to slide along the cam portion of the plate 21 without engagement with the notch 20, the cam serving thus to permit the parts to come again to the position shown in dotted lines in Fig. 3, which is the normal position which the parts occupy when the clutch is in operative engagement.

As will be readily understood, the arm 13 normally stands in position farther in advance than that shown in Fig. 1, with the pin 19 in contact with the latch 17 at a point nearer the free end of the latch member, as is indicated in dotted lines in Fig. 3. When it is desired to throw the clutch out of operation for stopping the tractor, this is accomplished either by the application of downward pressure upon the lever 10 through the medium of the pedal 12 or by a backward pull upon the arm 13. The arm 13 is adapted to be moved backward either by the application of power directly thereto or by a backward pull thereon through the medium of a cord or cable 24. By the use of this construction I have found that a single operator can run both a tractor and the machine which is being drawn thereby, such as a plow or a binder. When it is necessary for the operator to be in position upon the machine being drawn, he can effect a release of the main driving clutch of the tractor by a backward pull upon the cable 24 in case it becomes necessary to stop the machine. As soon as the arm 13 is moved backward sufficiently to permit engagement of the pin 19 with the notch 20, the arm 13 can be released, whereupon the latch member serves to hold the foot lever 10 in its lowered position. When, thereafter, it is desired to start the tractor again in its forward motion, this can be accomplished by the application of power again to the cable 24 for moving the arm 13 backward for causing the pin 19 to pass the cam plate 21. Upon a release then of the cable 24 the pin 19 is prevented from engaging the notch 20 upon the return movement of the pin 19, and the foot lever 10 is permitted to move again to normal position for permitting re-engagement of the clutch members.

While I have illustrated and described the preferred form of construction for carrying my invention into effect, this is capable of variation and modification without departing from the spirit of invention. I, therefore, do not wish to be limited to the precise details of construction set forth, but desire to avail myself of such variations and modification as come within the scope of the appended claims.

Having described my invention, what I claim as new and desire to secure by Letters Patent is:—

1. A clutch controlling mechanism comprising in combination a lever by a stroke of which in one direction said clutch is thrown out of operation; means for imparting to said lever an operative stroke; a latch adapted automatically to have operative engagement with said lever moving means for holding the clutch out of operation; and means adapted upon a further movement of said lever moving means in the same direction to release said latch for permitting re-engagement of the clutch, substantially as described.

2. A clutch controlling mechanism comprising in combination a lever by a stroke of which in one direction said clutch is thrown out of operation; an arm pivotally mounted on said lever; means for limiting the swinging of said arm with respect to said lever; a latch adapted automatically to engage said arm for holding the clutch out of operation; and means adapted upon a pivotal movement of said arm with respect to said lever to release the latch for permitting re-engagement of the clutch, substantially as described.

3. A clutch controlling mechanism comprising in combination means adapted by a stroke in one direction to throw the clutch out of operation; latch means adapted automatically upon an operative movement of said clutch releasing means to hold the clutch out of operation; and a movably mounted cam adapted upon a movement of the latch beyond its normal engaging position to prevent engagement of the latch upon its return movement, substantially as described.

4. A clutch controlling mechanism comprising in combination means adapted by a stroke in one direction to throw the clutch out of operation; latch means adapted automatically upon an operative movement of said clutch releasing means to hold the clutch out of operation; and a cam pivotally mounted on said latch adapted by a movement of the latch beyond its normal engaging position to prevent engagement of the latch upon its return movement, substantially as described.

5. A clutch controlling mechanism comprising in combination a lever by a stroke of which in one direction said clutch is thrown out of operation; means for giving said lever an operative stroke; a pivotally mounted member having a hook on its under face adapted to engage said lever moving means for holding the clutch out of operation; and means carried by the hook member adapted to permit engagement between the hook and lever moving means when the hook approaches the engaging position from one direction but adapted to prevent engagement when the hook approaches such engaging position from the opposite direction, substantially as described.

6. A clutch controlling mechanism comprising in combination a lever by a stroke of which in one direction said clutch is thrown out of operation; means for giving said lever an operative stroke; a pivotally mounted member having a hook on its underface adapted to engage said lever moving means for holding the clutch out of operation; and a cam pivotally mounted on said latch, adapted normally to stand opposite said hook but adapted to be displaced upon the approach of the hook from one direction to the position for engaging said lever moving means, while serving to prevent engagement upon the approach of the hook from the opposite direction, substantially as described.

7. A clutch controlling mechanism comprising in combination a lever by a stroke of which in one direction said clutch is thrown out of operation; an arm mounted on said lever; a pivotally mounted latch member having a sliding contact with said arm and adapted to have operative engagement therewith for holding the clutch out of operation when said lever is given an operative stroke for releasing said clutch; and cam means operable by gravity adapted upon a movement of the arm beyond the normal engaging position of said latch to prevent reengagement of the latch upon the return movement, substantially as described.

8. A clutch controlling mechanism comprising in combination a lever by a stroke of which in one direction said clutch is thrown out of operation; an arm mounted on said lever; a pin projecting from one face of said arm; a pivotally mounted latch member supported by said pin and adapted to engage the pin for holding the clutch out of operation when said lever is given an operative stroke for releasing said clutch; and a cam pivotally mounted on said latch member adapted to permit engagement of the pin by the latch upon the operative stroke of the lever but adapted to prevent an engagement between the pin and the latch when the pin approaches the hook of the latch from the opposite side, substantially as described.

9. A clutch controlling mechanism comprising in combination a lever by a stroke of which in one direction said clutch is thrown out of operation; an arm mounted on said lever; a pin projecting from one face of said arm; a pivotally mounted latch member supported by said pin and adapted to engage the pin for holding the clutch out of operation when said lever is given an operative stroke for releasing said clutch; and a cam pivotally mounted on said latch member opposite the hook portion thereof adapted to be displaced for permitting engagement of the pin by the latch upon the operative stroke of the lever but adapted to be moved by gravity into position for preventing engagement between the pin and the latch when the pin approaches the hook of the latch from the opposite direction, substantially as described.

In testimony whereof I have signed my name to this specification in the presence of two subscribing witnesses.

WILLIAM B. HUGGINS.

Witnesses:
W. A. WEBSTER,
HELEN R. JOHNSON.